United States Patent
Arnold

(10) Patent No.: US 11,207,961 B2
(45) Date of Patent: Dec. 28, 2021

(54) VEHICLE VISOR COVER

(71) Applicant: Duane Arnold, Texas City, TX (US)

(72) Inventor: Duane Arnold, Texas City, TX (US)

(73) Assignee: VizarConcepts LLC, Texas City, TX (US)

( * ) Notice: Subject to any disclaimer, the term of this patent is extended or adjusted under 35 U.S.C. 154(b) by 468 days.

(21) Appl. No.: 16/155,663

(22) Filed: Oct. 9, 2018

(65) Prior Publication Data

US 2020/0055382 A1    Feb. 20, 2020

Related U.S. Application Data

(60) Provisional application No. 62/719,532, filed on Aug. 17, 2018.

(51) Int. Cl.
   *B60J 11/06*    (2006.01)

(52) U.S. Cl.
   CPC ..................... *B60J 11/06* (2013.01)

(58) Field of Classification Search
   CPC ... B60J 11/06; B60J 3/00; B60J 3/0204; B60J 3/0278; B60J 3/0208; B60R 7/05; B60R 2011/0035; B60R 2011/0059
   USPC .............. 296/97.1, 97.5, 97.6; 160/387–390; 224/312
   See application file for complete search history.

(56) References Cited

U.S. PATENT DOCUMENTS

| | | |
|---|---|---|
| 2,517,337 A | 8/1950 | Nodle |
| 2,707,072 A | 9/1950 | Sims |
| 2,589,348 A | 3/1952 | Diefenbach |
| 2,931,114 A | 3/1957 | Peterson |
| 3,809,428 A | 5/1974 | Cohen |
| 4,781,409 A | 11/1988 | Harbison |
| 4,944,971 A | 7/1990 | McLaughlin |
| D309,756 S | 8/1990 | Lothridge |
| 5,772,272 A | 6/1998 | Faddis |
| D432,490 S | 10/2000 | Golenz |
| D436,916 S | 1/2001 | Eskandry |
| 6,276,081 B1 | 8/2001 | Shedd |
| 6,659,529 B2 | 12/2003 | Palmer et al. |
| 7,044,531 B2 | 5/2006 | Schaad |
| 7,216,918 B1 | 5/2007 | Runfola |
| 7,686,373 B1 | 3/2010 | McCabe et al. |
| 7,818,907 B1 | 10/2010 | Warrington, Jr. |
| 8,544,933 B1 * | 10/2013 | Fuller .................... B60J 3/0208 296/97.6 |
| 8,561,865 B2 | 10/2013 | Mantis |

(Continued)

*Primary Examiner* — Catherine A Kelly
*Assistant Examiner* — Jeremy C Ramsey
(74) *Attorney, Agent, or Firm* — The Juhasz Law Firm

(57) ABSTRACT

A cover for a vehicle includes two straps with at least one strap forming a connector at one end; a cover panel with at least one of top and bottom loops along top and bottom peripheries of the cover panel and at least one of a first and second opening along at least one of the one of top and bottom loops configured to receive a connector on the end of the at least one strap; and at least one of a first and a second pole disposed through the loop of the cover panel and engaging the connector on the end of the at least one strap. The connector is configured to releasably secure the strap to the cover panel. The cover panel may be placed against one side of a visor with the straps against the other side of the visor to form a system. A method for assembling the cover and system are also disclosed.

20 Claims, 22 Drawing Sheets

(56) References Cited

U.S. PATENT DOCUMENTS

| | | | |
|---|---|---|---|
| 9,707,828 B2* | 7/2017 | Arnold | B60J 3/0204 |
| 2002/0074838 A1 | 6/2002 | Whiting et al. | |
| 2019/0160930 A1* | 5/2019 | Brown | B60J 11/00 |

* cited by examiner

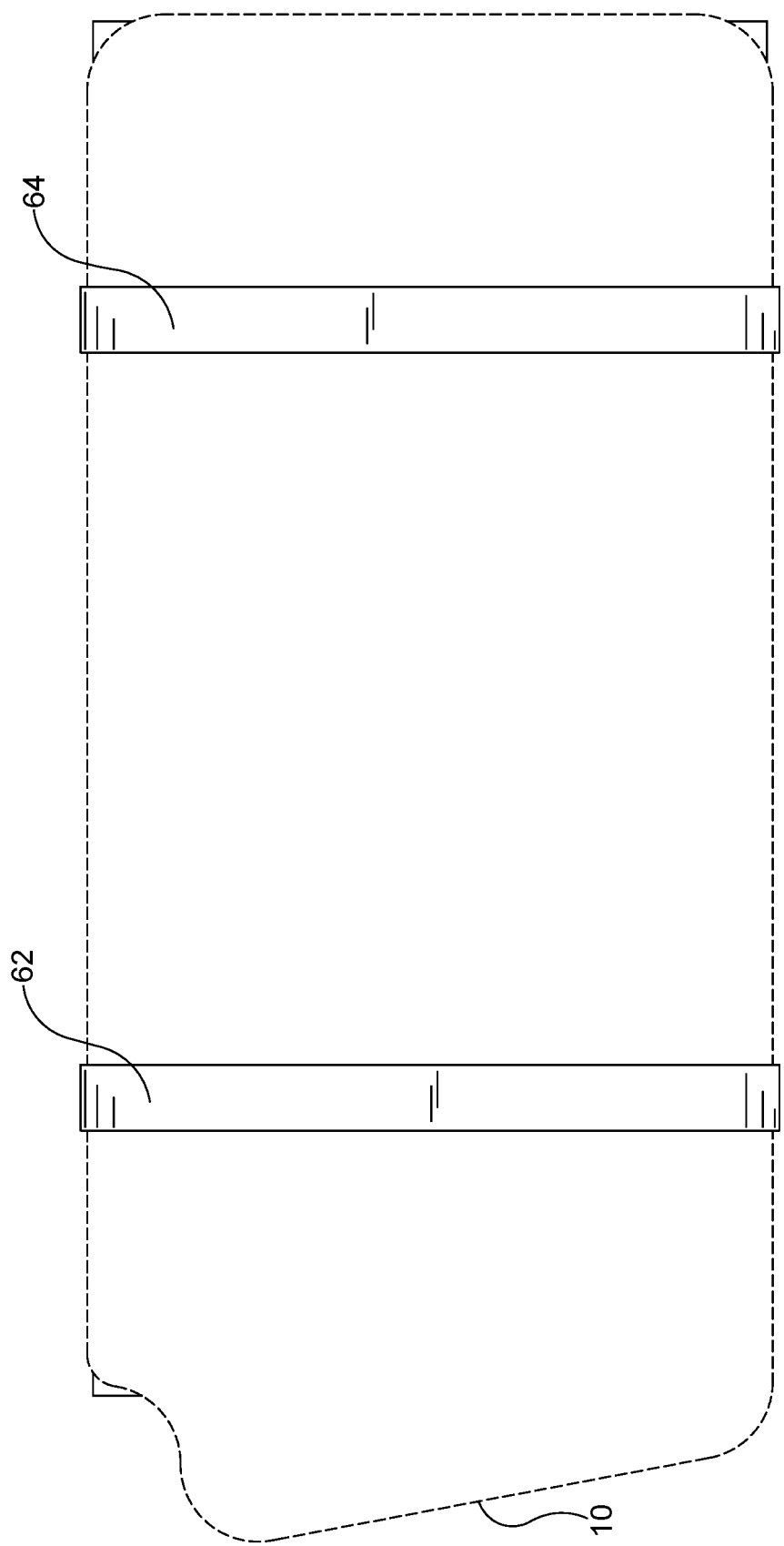

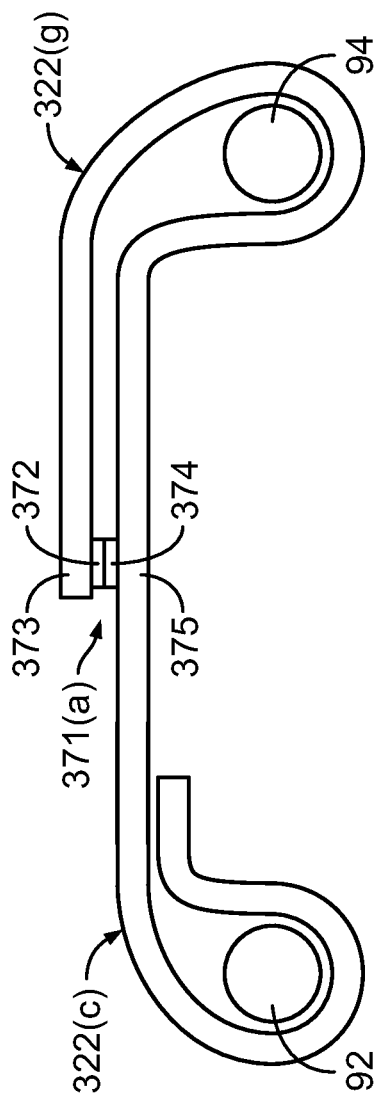

VEHICLE VISOR COVER

TECHNICAL FIELD

The present invention relates generally to visors of vehicles. More particularly, the present invention relates to covers for vehicle visors.

BACKGROUND

There exist a number of covers for visors installed in or on a vehicle, such as a car, truck or vessel. Typically, the cover is fixed to the visor by making the cover a sleeve or having fixed strapping. Either attachment means must be tailored for the specific visor shape. This in turn requires visor covers to be customized to fit the wide variety of vehicle visors that are on the market.

In U.S. Pat. No. 9,707,828 of Applicant, there is disclosed a vehicle visor cover including a cover with removable strapping with sufficient dimensions to span one side of a vehicle visor and at least one strap configured with a strap coupler on each end to releaseably attach to a cover coupler attached to the upper and lower periphery of the cover.

There is a need for a cover that is easy to attach, more user friendly, and more functional.

Unless otherwise indicated herein, the materials described in this section are not prior art to the claims in this application and are not admitted to be prior art by inclusion in this section.

SUMMARY

A cover for a vehicle includes a cover panel, a first pole and a second pole, and a first strap and a second strap. The cover panel includes a cover loop along a top periphery forming a top cover loop and a cover loop along a bottom periphery of the cover panel forming a bottom cover loop. The top cover loop and the bottom cover loop each include a first cover opening and a second cover opening. The first cover opening and the second cover opening of each of the top cover loop and the bottom cover loop are spaced apart from each other. The first cover opening of each of the top cover loop and the bottom cover loop and the second cover opening of each of the top cover loop and the bottom cover loop are in general alignment with respect to each other. The first pole is disposed through the top cover loop and the second pole is disposed through the bottom cover loop. Each strap includes a first strap connector on a first end and a second strap connector on a second end of the strap. The first strap connector on each of the first strap and the second strap engage the first pole through the first cover opening and the second cover opening of the top cover loop. The second strap connector on each of the first strap and the second strap engage the second pole through the first cover opening and the second cover opening of the bottom cover loop. The engagement of the first pole by the first strap connector on each of the first strap and the second strap through the first cover opening and the second cover opening of the top cover loop and the engagement of the second pole by the second strap connector on each of the first strap and the second strap through the first cover opening and the second cover opening of the bottom cover loop releasably secure the first strap and the second strap to the cover panel.

In another aspect, a cover for a vehicle includes a cover panel, a first pole, and a first and a second strap. A first cover loop is provided along at least part of one of a top periphery or a bottom periphery of the cover panel. The cover loop includes a first cover opening. The first pole is disposed through the first cover loop. One of the first strap and the second strap is integrally or releasably connected at a first end to one of the top periphery and the bottom periphery of the cover panel and is integrally or releasably connected at a second end to the one of the top periphery and the bottom periphery of the cover panel. Another of the a first strap and a second strap is integrally or releasably connected at a first end to one of the top periphery and the bottom periphery of the cover panel and is releasably connected by a first strap connector at a second end to the one of the top periphery and the bottom periphery of the cover panel. The first strap connector engages the first pole through the first cover opening of the first cover loop. The engagement of the first pole by the first strap connector releasably secures the associated strap to the cover panel.

In another aspect, a method for assembly of a cover to a visor includes: forming a fold along a top periphery of a cover panel to form a first cover loop; forming a first and second opening in the first cover loop; forming a fold along a bottom periphery of the cover panel to form a second cover loop; forming a first and second opening in the second cover loop; positioning a cover panel on one side of a visor; positioning on an other side of the visor a first strap; inserting a first strap loop formed at a first end of the first strap into the first opening on the first cover loop; disposing a first pole through the first cover loop through the first strap loop formed at the first end of the first strap; positioning on the an other side of the visor a second strap; inserting a first strap loop formed at a first end of the second strap into the second opening on the first cover loop; disposing the first pole through the first cover loop through the first strap loop formed at the first end of the second strap; inserting a second strap loop formed at a second end of the first strap into the first opening on the second cover loop; disposing a second pole through the second cover loop through the second strap loop; inserting a second strap loop formed at a second end of the second strap into the second opening on the second cover loop; and disposing the second pole through the second cover loop through the second strap loop.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 1A-1H collectively hereinafter FIG. 1.

FIGS. 3A-3F show illustrative strap configurations according to this disclosure. FIGS. 3A-3F collectively hereinafter FIG. 3.

FIGS. 4A-4B collectively hereinafter FIG. 4.

FIGS. 5A and 5B collectively hereinafter FIG. 5.

FIGS. 6A and 6B collectively hereinafter FIG. 6.

DETAILED DESCRIPTION

Figure 1A:
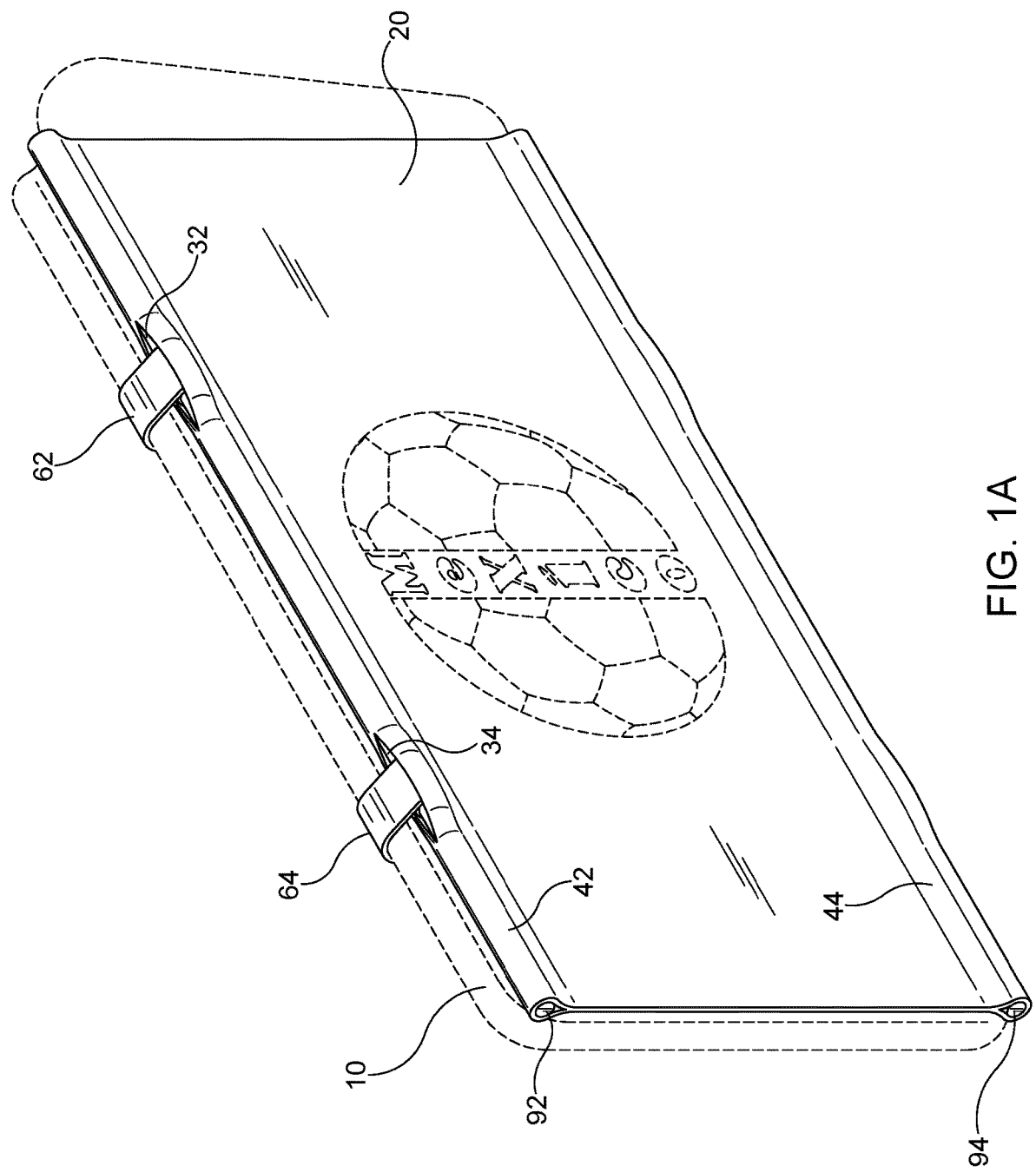
FIG. 1A shows a perspective view, FIG. 1B a front view, FIG. 1C a back view, FIG. 1D a top view, FIG. 1E a bottom view, FIG. 1F a right side view, FIG. 1G a left side view.
Figure 1B:
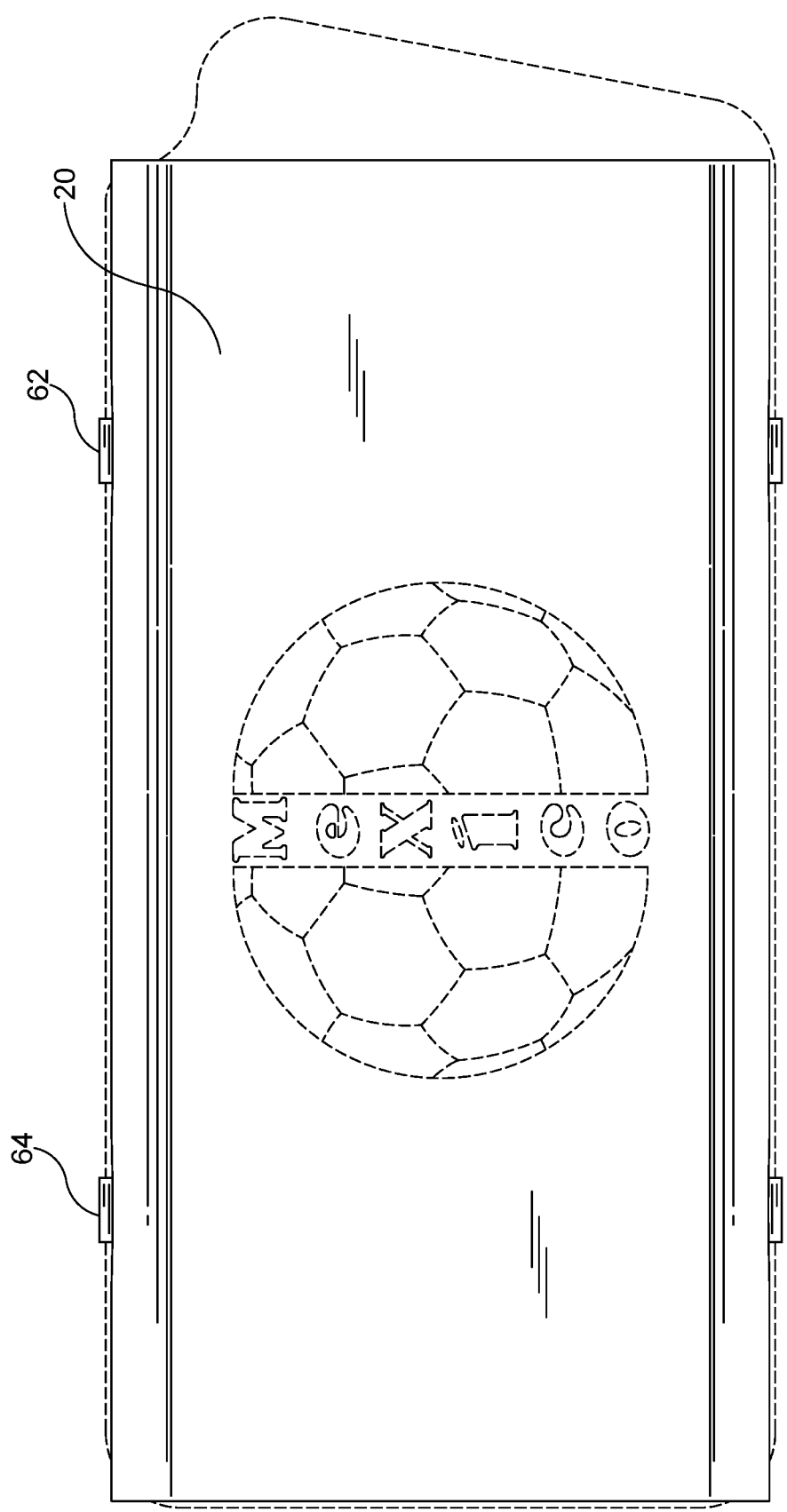

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Broadly speaking, a cover for a vehicle comprises two straps with at least one strap forming a first connector at one end; a cover panel with at least one of top and bottom loops along top and bottom peripheries of the cover panel and at least one of a first and second opening along at least one of the one of top and bottom loops configured to receive the first connector on the end of the at least one strap; and at least one of a first and a second pole disposed through the loop of the cover panel and engaging the first connector on the end of the at least one strap, the first connector configured to hold the strap to the cover panel for releasable securing the strap to the cover panel. The cover panel may be placed against one side of a visor with the straps against the other side of the visor to form a system.

In some other aspects, a second connector is formed at another end of the at least one strap forming a first connector at one end; the cover panel includes top and bottom loops along top and bottom peripheries of the cover panel; each top and bottom loop includes a first opening configured to receive the first connector and the second connector on the end of the at least one strap; a first pole is disposed through the top loop of the cover panel and engaging the first connector on the end of the at least one strap, and a second pole is disposed through the bottom loop of the cover panel and engaging the second connector on the another end of the at least one strap; the first connector and the second connector configured to hold the strap to the cover panel for releasable securing the strap to the cover panel. The cover panel may be placed against one side of a visor with the straps against the other side of the visor to form a system.

In some aspects, a cover for a vehicle comprises a first strap forming a first connector at one end and a second strap forming a first connector at one end; a cover panel with at least one of top and bottom loops along top and bottom peripheries of the cover panel and a first and second opening along at least one of the top and bottom loops configured to receive respectively the first connector on the end of each of the two straps; and at least one of the a first and a second pole disposed through the loop of the cover panel and engaging the first connector on the end of the first strap and the first connector on the end of the second strap, the first connector on the end of the two straps configured to hold the two straps to the cover panel for releasable securing the strap to the cover panel. The cover panel may be placed against one side of a visor with the straps against the other side of the visor to form a system.

In another aspect each of the two straps forms a connector on both ends; a cover panel includes top and bottom loops formed along top and bottom peripheries of the cover panel; each loop includes a first and second opening along the top and bottom loops configured to receive respectively the connector on the end of each of the two straps. A first and a second pole are disposed through the top and bottom loops along top and bottom peripheries of the cover panel and engaging the respective connector inserted into a respective first and second openings along the top and bottom loops along top and bottom peripheries. The connectors are configured to releasably secure the straps to the cover panel. The cover panel may be placed against one side of a visor with the straps against the other side of the visor to form a system. A method for assembling the cover and system are also disclosed.

Illustrative Embodiment A

FIG. 1 shows an illustrative embodiment of this disclosure. More specifically, FIG. 1A shows a perspective view, FIG. 1B a front view, FIG. 1C a back view, FIG. 1D a top view, FIG. 1E a bottom view, FIG. 1F a right side view, FIG. 1G a left side view of an illustrative embodiment of this disclosure.

Figure 1D:
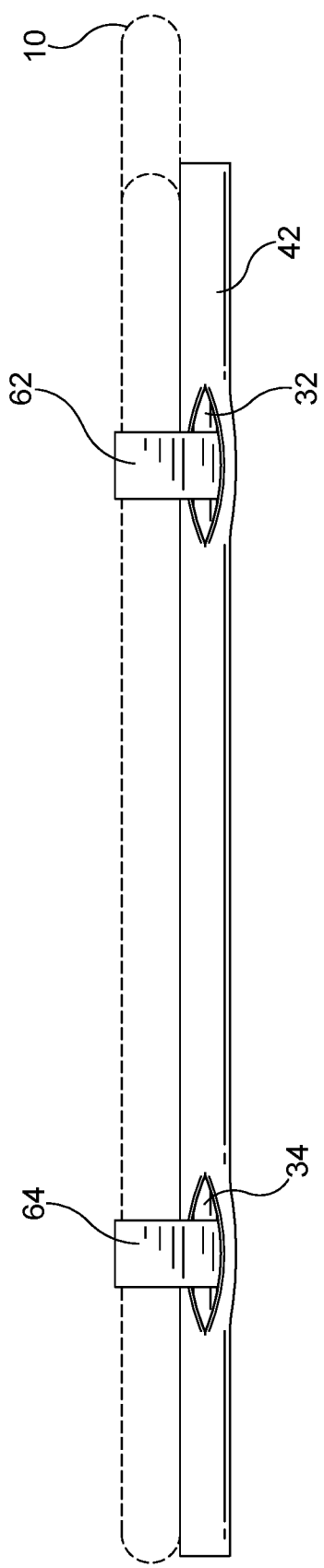
Figure 1E:
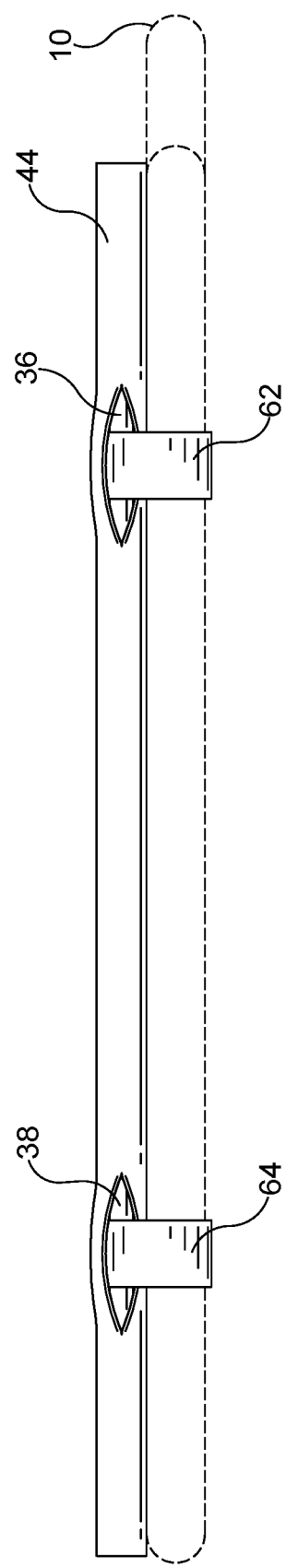
Figure 1G:
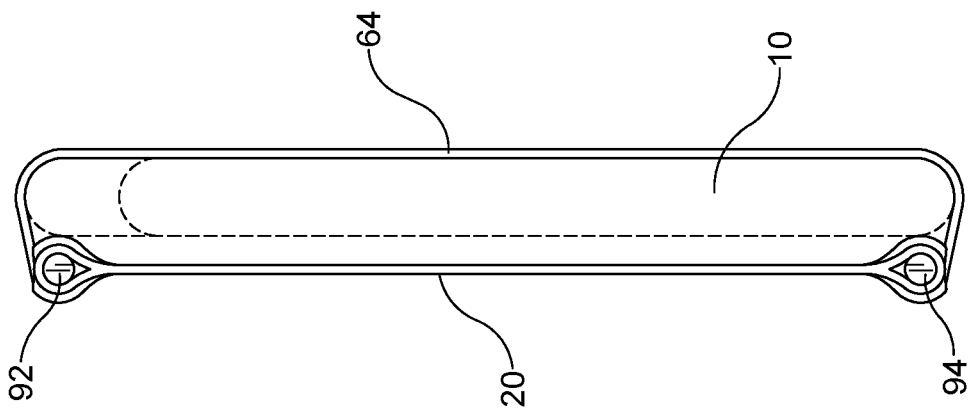
Figure 1F:
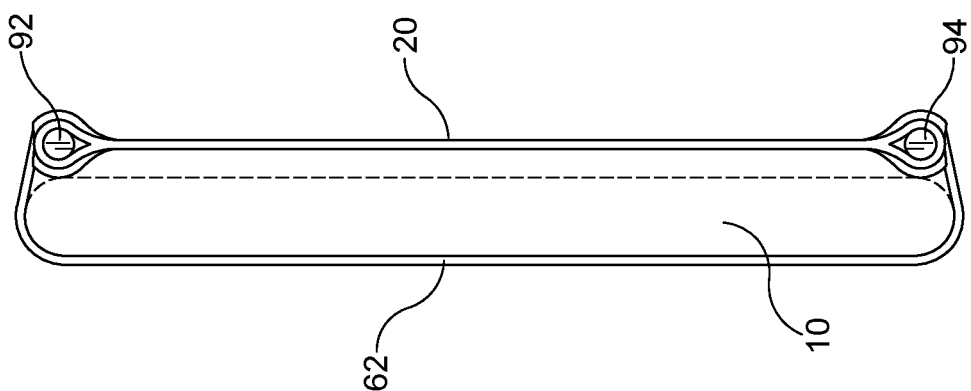

As shown in FIG. 1A, the cover of this disclosure comprises a cover panel 20, a first pole 92 and a second pole 94 (see FIGS. 1F, 1G), and a first strap 62 and a second strap 64. As shown in FIGS. 1A. 1D, 1E, the cover panel 20 includes a cover loop along a top periphery forming a top cover loop 42 and a cover loop along a bottom periphery of the cover panel 20 forming a bottom cover loop 44. The top cover loop 42 and the bottom cover loop 44 each include a first cover opening 32, 36 (FIG. 1D, 1E) and a second cover opening 34, 38 (FIG. 1D, 1E). The first cover opening and the second cover opening of each of the top cover loop 42 and the bottom cover loop 44 are spaced apart from each other. The first cover opening of each of the top cover loop 42 and the bottom cover loop 44 and the second cover opening of each of the top cover loop 42 and the bottom cover loop 44 are in general alignment with respect to each other.

Figure 1H:
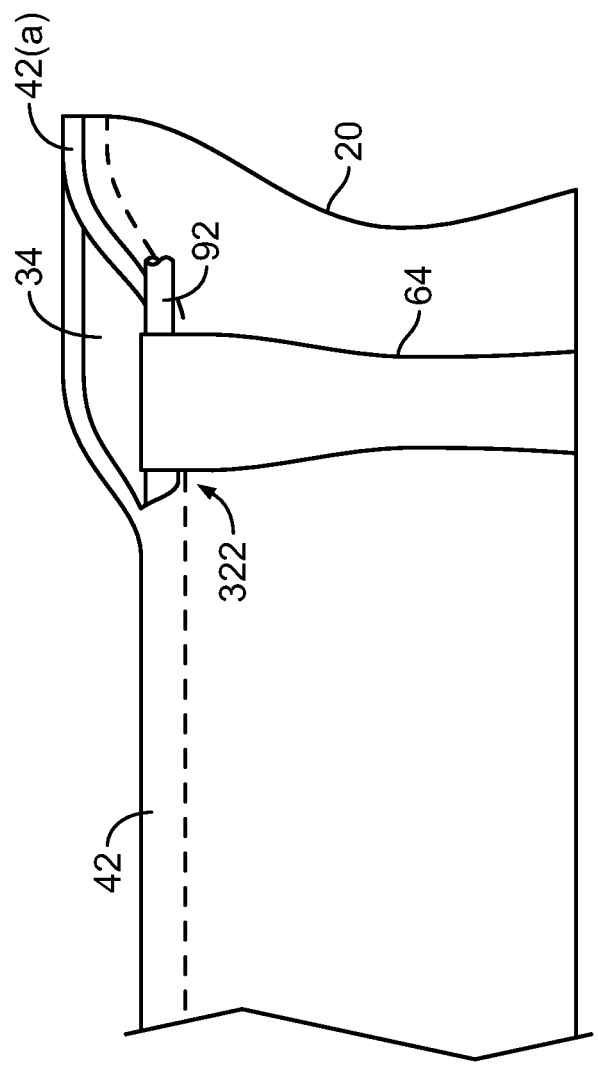
FIG. 1H is a part assembly of an illustrative embodiment of this disclosure.

As shown in FIGS. 1A, 1H, the first pole 92 is disposed through the top cover loop 42 and the second pole 94 is disposed through the bottom cover loop 44.

In FIG. 1, the top cover loop 42 and the bottom cover loop 44 are formed by an end portion of the cover panel 20 being folded back onto and being integrally connected to the portion of the panel adjoining the end portion. Depending on the material used for the cover, the integral connection may be effected by stitching, adhesive, ultrasonic bonding, and so on. The first cover opening 32, 36 and the second cover opening 34, 38 are formed at the outer edge of the top cover loop 42 and the bottom cover loop 44 with a portion of the top cover loop 42 and the bottom cover loop 44 illustratively forming all sides of the first cover opening 32, 26 and the second cover opening 34, 38.

Figure 2:
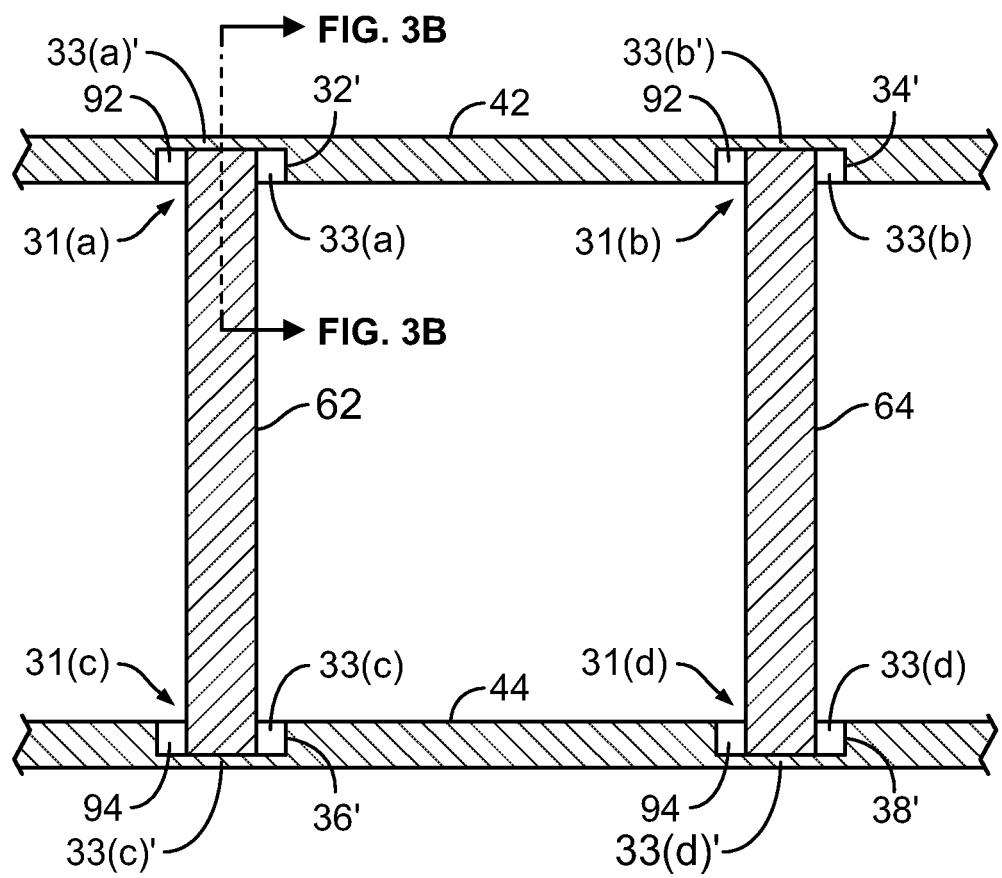
FIG. 2 shows another illustrative embodiment of this disclosure.

FIG. 2 shows an alternative embodiment wherein a portion 33(*a*)', 33(*b*)' of the top cover loop 42 and a portion 33(*c*)', 33(*c*)' of the bottom cover 44 forms a back side of the first cover opening 32, 36 and the second cover opening 34, 38 but no part of a front side 31(*a*), 31(*b*), 31(*c*), 31(*d*) of the top cover loop 42 and the bottom cover loop 44. The absence of a fold of the top cover loop 42 and the bottom cover loop 44 forming a front side of the top cover loop 42 and the bottom cover loop 44 removes material in the path of the strap which allows for a straighter path taken by the strap between the first and the second poles and reduced wear between the cover loop and the straps. In alternative embodiments, the bottom cover loop 44 may form some part of a front side 31(*a*), 31(*b*), 31(*c*), 31(*d*) of the top cover loop 42 and the bottom cover loop 44.

Figure 3A:
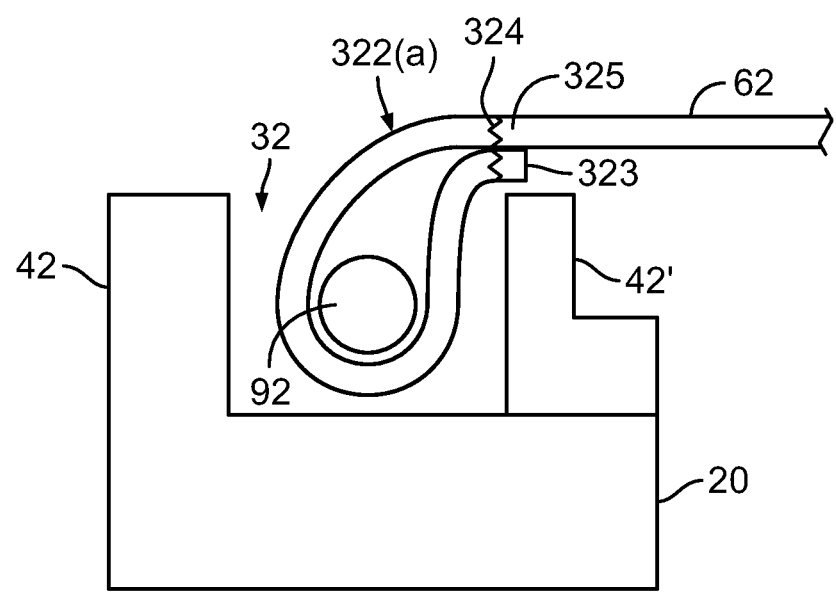
Figure 3B:
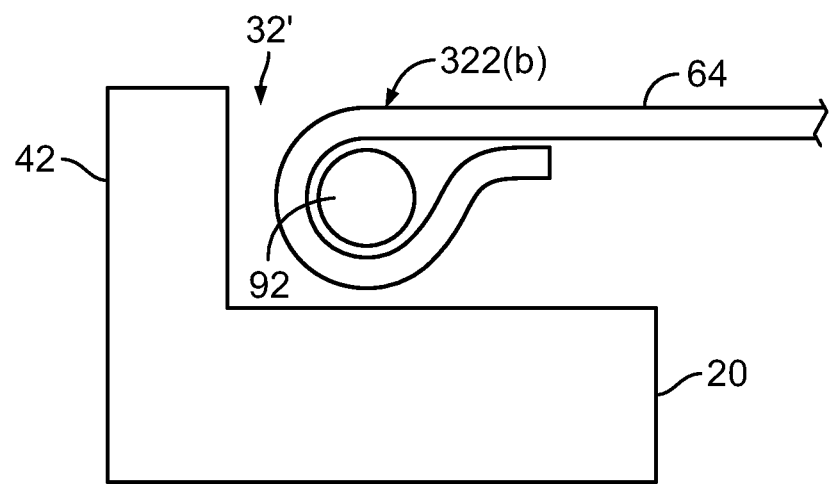

FIG. 3A depicts a cross section of the cover depicted in FIG. 1C showing a side 42' of top cover loop 42 forming a side of first cover opening 32. FIG. 3B, which depicts a cross section of the cover depicted in FIG. 2, shows no side 42'. In the embodiment shown in FIG. 2, each strap includes a first strap connector 31*a*, 31*b* on a first end and a second strap connector 31*c*, 31*d* on a second end of the straps 62, 64. The first strap connector 31*a*, 31*b* on each of the first strap 62 and the second strap 64 engage the first pole 92 through the first cover opening 32' and the second cover opening 34' of the top cover loop 42. The second strap connector 31*c*, 31*d* on each of the first strap 62 and the second strap 64 engage the second pole 94 through the first cover opening 36' and the second cover opening 38' of the bottom cover loop 44.

The engagement of the first pole 92 by the first strap connector 31*a*, 31*b* on each of the first strap 62 and the second strap 64 through the first cover opening 32' and the second cover opening 34' of the top cover loop 42 and the engagement of the second pole 94 by the second strap connector 31*c*, 31*d* on each of the first strap 62 and the second strap 64 through the first cover opening 36' and the second cover opening 38' of the bottom cover loop 44 releasably secure the first strap 62 and the second strap 64 to the cover panel 20.

FIG. 3 shows illustrative strap configurations and strap connector configurations according to this disclosure. In one aspect shown in FIGS. 3A, 3B, at least one of either the first strap connector or the second strap connector is a strap loop 322*a*, 322*b*, respectively formed by an end portion of the at least one of either the first strap 62 or the second strap 64 being folded back onto and integrally connected to the portion of the at least one of either the first strap 62 or the second strap 64 adjoining the end portion. FIG. 3A shows the folded back portion 323 against adjoining end 325 where an integral connection 324 is made. Depending on the material used for the cover, the integral connection 324 may be effected by stitching, adhesive, ultrasonic bonding, and so on. For instance, the integral connection 324 may be a stitching through the folded back portion 323 and adjoining end 325 that holds the two together. The strap loop 322*a*, 322*b* loops around at least one of either the first pole 92 (shown as first pole 92 in FIGS. 3A and 3B) or alternatively the second pole 94 through at least one of the first cover opening or the second cover opening (shown as first cover opening 32, 32' in FIGS. 3A and 3B). If both ends of a strap are configured with a strap loop 322*a*, 322*b*, then opposing loops would loop around the opposing poles 92, 94 in one example. The coupling and decoupling of the at least one of either the first pole 92 or the second pole 94 (shown as first pole 92 in FIGS. 3A and 3B) and the strap loop 322*a*, 322*b* releasably secures the strap to the cover panel 20.

One coupling/decoupling of a strap loop 322 is shown in FIG. 1H. More specifically, the first pole 92 is shown disposed through loop 42 of the cover and through strap loop 322 of strap 64 received by the second cover opening 34. The engagement of the strap 64 to the cover panel 20 is secure upon disposing of the pole 92 through the remaining portion 42(*a*) of the top cover loop. The loop 42 holds the pole 92 which holds the strap loop 322 to the cover.

Figure 3D:
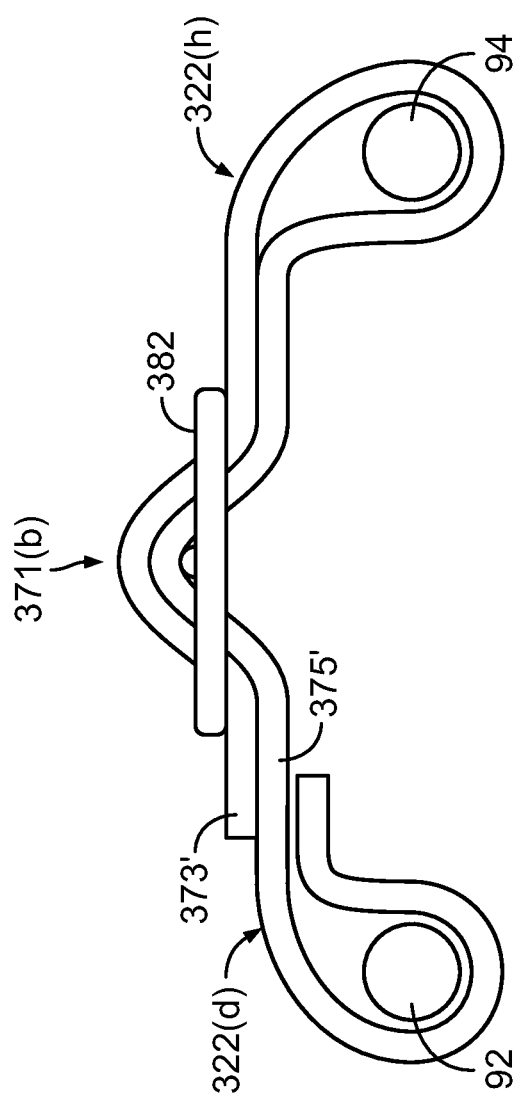

FIGS. 3C, 3D show another aspect of this disclosure wherein at least one of either the first strap connector or the second strap connector of at least one of either the first strap 62 or the second strap 64 is a strap loop 322(*c*), 322(*d*) formed by an end portion being folded back onto itself and being integrally attached as previously explained. Strap loops 322(*g*), 322(*h*) are simply looped around second pole 94 in this example with the ends 373, 373' of the strap held to an adjoining portion 375, 375' of the strap by a velco 372, 374, buckle 382 or other mechanism.

Figure 3E:
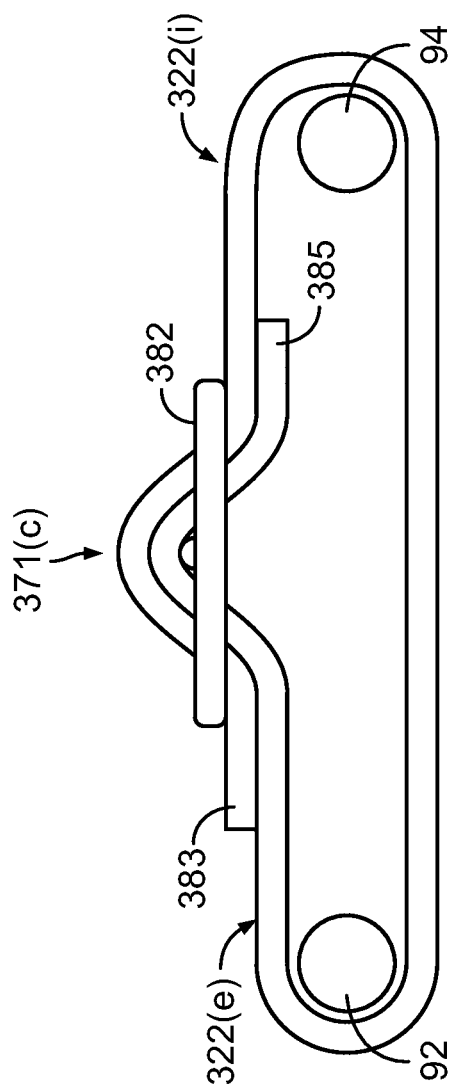

FIG. 3E shows another aspect of this disclosure wherein both the first strap connector or the second strap connector of at least one of either the first strap 62 or the second strap 64 is a strap loop 322(*e*), 322(*i*) formed by an end portion 383, 385 of the strap wrapping around poles 92, 94 and being held to each other by a buckle mechanism 382.

Figure 3F:
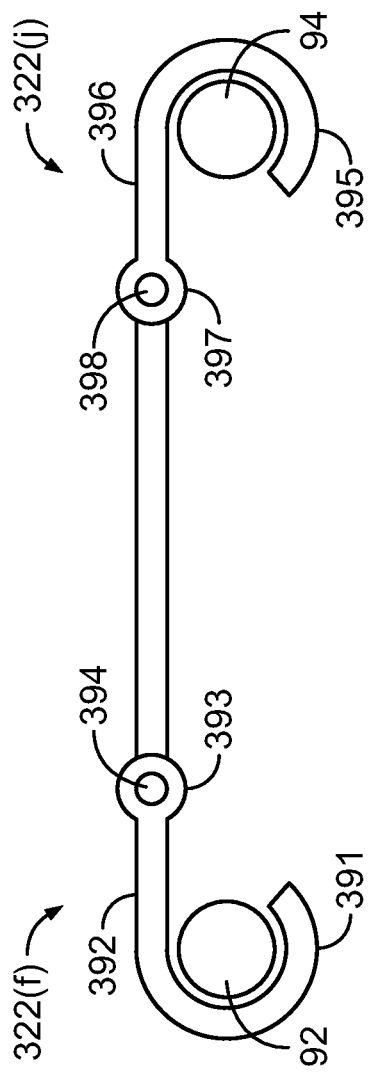

FIG. 3F shows a strap connector showing both strap connecters 322(*f*) and 322(*j*), formed as a releasable hook. Alternatively, one strap connector may be a releasable hook and another strap connector may be any of the connectors herein disclosed. The releasable hook may be formed from material that provides for a snap fit for firmly engaging the pole. In an alternative embodiment, the releasable hook may be made from a material that engages the pole with tightening adjustment of the strap removing the play between releasable hook and pole so as to provide the firm engagement of releasable hook to pole in order to securely hold the strap to the cover. The releasable hook may be made from plastic, metal, wood, or other material to engage the pole. The strap may be made from a stretchable or expandable material that holds the connectors and strap firmly to the cover when the strap extends across the visor.

FIG. 3F shows the strap connector 322(*f*), 322(*j*) with a stem portion 392, 396 including an annular end portion 393, 397 for connecting to shoulders or lugs at the end of the strap (not shown) in the adjoining ends of the strap by a spring bar 394, 398. The shoulder or lugs and the spring bar may be similar to conventional technology for attaching a watch band to a watch. When depressed, the spring bar 394, 398 extends into the shoulders or lugs of the strap to snap into place in the shoulders or the lugs and hold the releasable hook to the strap.

In another aspect, the strap connector may be a releasable latch, a releasable clasp, a releasable fastener, or any releasable mechanism that may engage and hold the strap to the pole in a releasable engagement. In another aspect, at least one of either the first strap connector or the second strap connector of at least one of either the first strap 62 or the second strap 64 is selected from the group consisting of a releasable hook, a releasable latch, a releasable clasp, and a releasable fastener. Coupling and decoupling the releaseable attachment mechanism releasably secures the at least one of either the first strap 62 or the second strap 64 to the cover panel 20.

FIGS. 3C-3F further show alternative strap connectors for engaging the first pole 92 or the second pole 94. In FIGS. 3C-3E, the strap connector is configured as strap loop 322(*g*), 322(*h*), and 322(*i*). The strap loop is looped around at least one of either the first pole 92 or the second pole 94 through at least one of the first cover opening or the second cover opening.

FIGS. 3C-3E also show a releasable attachment mechanism that may be used with this disclosure. In FIGS. 3C-3E, where the strap loop 322(*g*), 322(*h*), 322(*e*) and 322(*i*) are looped around at least one of either the first pole 92 or the second pole 94 through at least one of the first cover opening or the second cover opening, the end portion of loop around portion may be disposed with and connected by a releaseable attachment mechanism to the portion of the at least one of either the first strap or the second strap adjoining the end portion. For example, end portion 373 is seen to be connected to adjoining portion 375 in FIG. 3C by releaseable mechanism 372, 374 explained below; end portion 373' is seen to be connected to 375' in FIG. 3D by releasable mechanism 371(*b*) explained below; and end portions 383, 385 are seen connected to adjoining ends by mechanism 382 in FIG. 3E.

In FIG. 3C, the releaseable attachment mechanism is a Velcro® hook and loop fastener. A hook part 372 of the Velcro hook and loop fastener is affixed to a side of the folded back portion of the at least one of either the first strap 62 or the second strap 64 facing the portion of the strap adjoining the end portion. A loop part 374 of the Velcro hook and loop fastener is affixed to a side of the portion of the at least one of either the first strap 62 or the second strap 64 adjoining and facing the end portion. Coupling and decoupling of the hook part of the Velcro hook and the loop fastener loop part of the Velcro hook and loop fastener releasably secures the strap to the cover panel 20.

In FIG. 3D, the releaseable attachment mechanism is a belt and buckle mechanism 382. A buckle part of the belt and buckle mechanism may be attached to the at least one of either the first strap 62 or the second strap 64. Alternatively, the buckle mechanism may be deteached from the strap and may be slipped over the ends of strap to hold the ends together. In another example, the belt part of the belt and buckle mechanism may lie along an end portion of the at least one of either the first strap 62 or the second strap 64. Coupling and decoupling of the strap through the buckle mechanism releasably secures the strap to the cover panel 20.

Figure 4A:
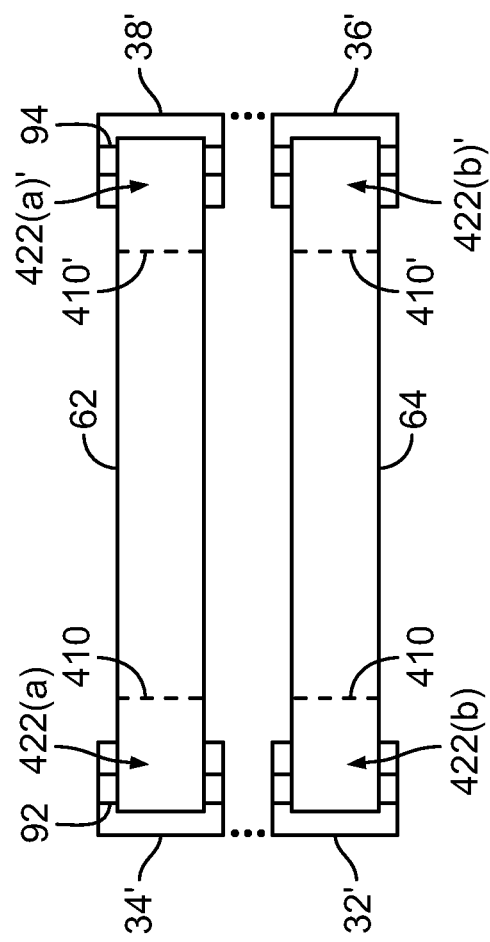
FIGS. 4A-4C show illustrative strap configurations according to this disclosure.
Figure 4B:
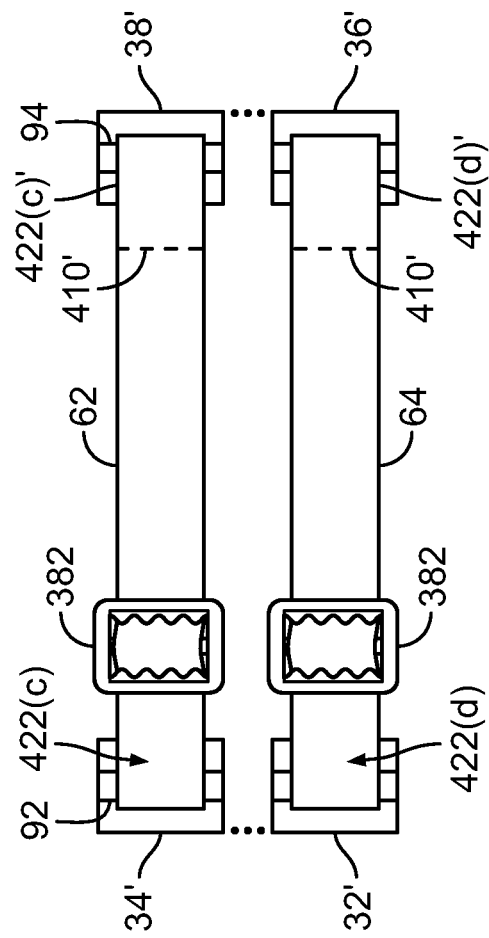

In another aspect, FIG. 4 shows the first strap 62 and the second strap 64 including a first strap loop 422 and a second strap loop 422'. Specifically, in FIG. 4A, the loop 422(*a*), 422(*b*), 422(*a*)', and 422(*b*)' are closed by a stitching 410. In FIG. 4B, loops 422(*c*)', 422(*d*)' are closed by stitching 410 whereas loops 422(*c*), 422(*d*) are closed by a releasable attachment mechanism 382, 382', in the illustrative embodiment shown as a buckle for attachment about an end of the strap to an adjoining portion of the strap after looping the strap around the first pole 92.

Figure 4C:
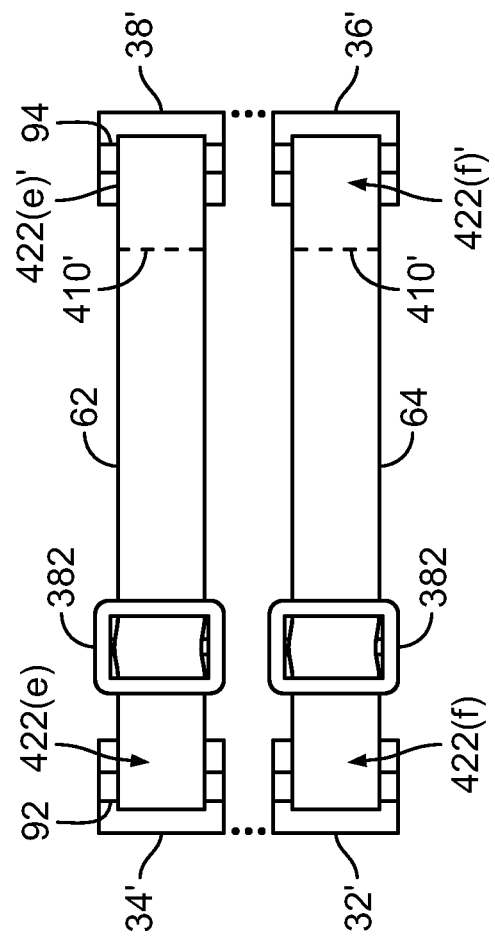

FIG. 4C is a top view of two straps configured in accordance with the depiction in FIG. 3E but with loops renumbered as loops 422(*e*), 422(*f*), 422(*e*)', 422(*f*)' shown looping around the respective poles 92, 94 and connected by a releasable attachment mechanism 382, 382', in the illustrative embodiment shown as a buckle for attachment about an end of the strap to an adjoining portion of the strap.

Figure 5A:
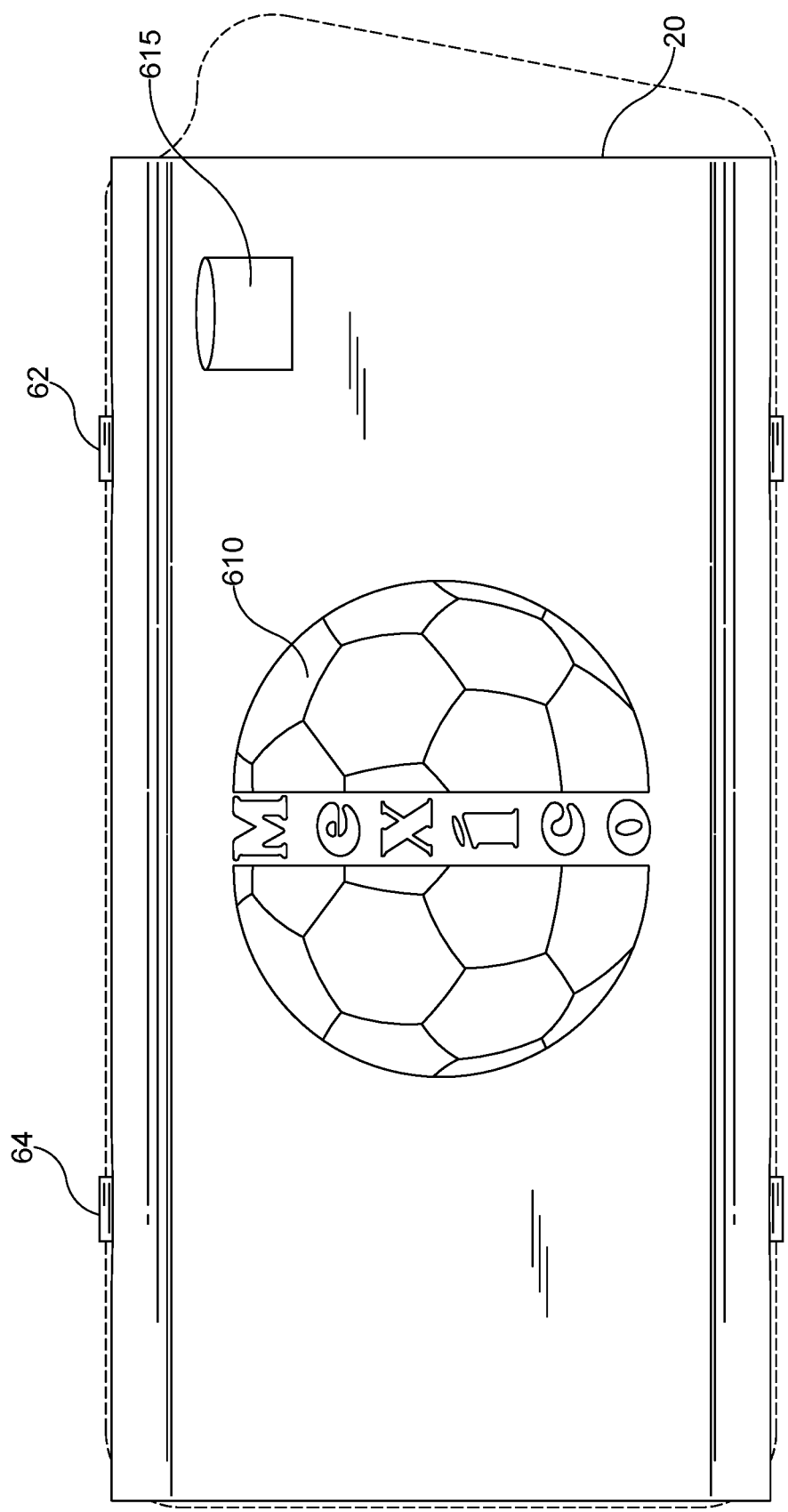
FIG. 5A shows illustrative cover panel provided with graphics according to this disclosure.

FIG. 5 shows another aspect of the cover of this disclosure. As shown in FIG. 5A, the cover panel 20 may be provided with graphics 610. Any graphics may be provided including words, marks, designs, pictures, or any visually perceptible artifact. The graphics on the cover panel 20 may be applying using any graphical design technique including silk screening, thermal printing, embroidery, and so on. The graphics may be applied using a technique taken from the group consisting of screened graphics, thermal printed graphics, and embroider graphics.

In another aspect the cover panel of this disclosure may include one or more pockets 615 for holding an object as shown in FIG. 5A. The object may be selected from the group consisting of a CD or an accessory.

In another embodiment, a pocket is provide along an inside surface of the cover 20 so that the pocket faces the visor when the cover is in place.

Figure 5B:
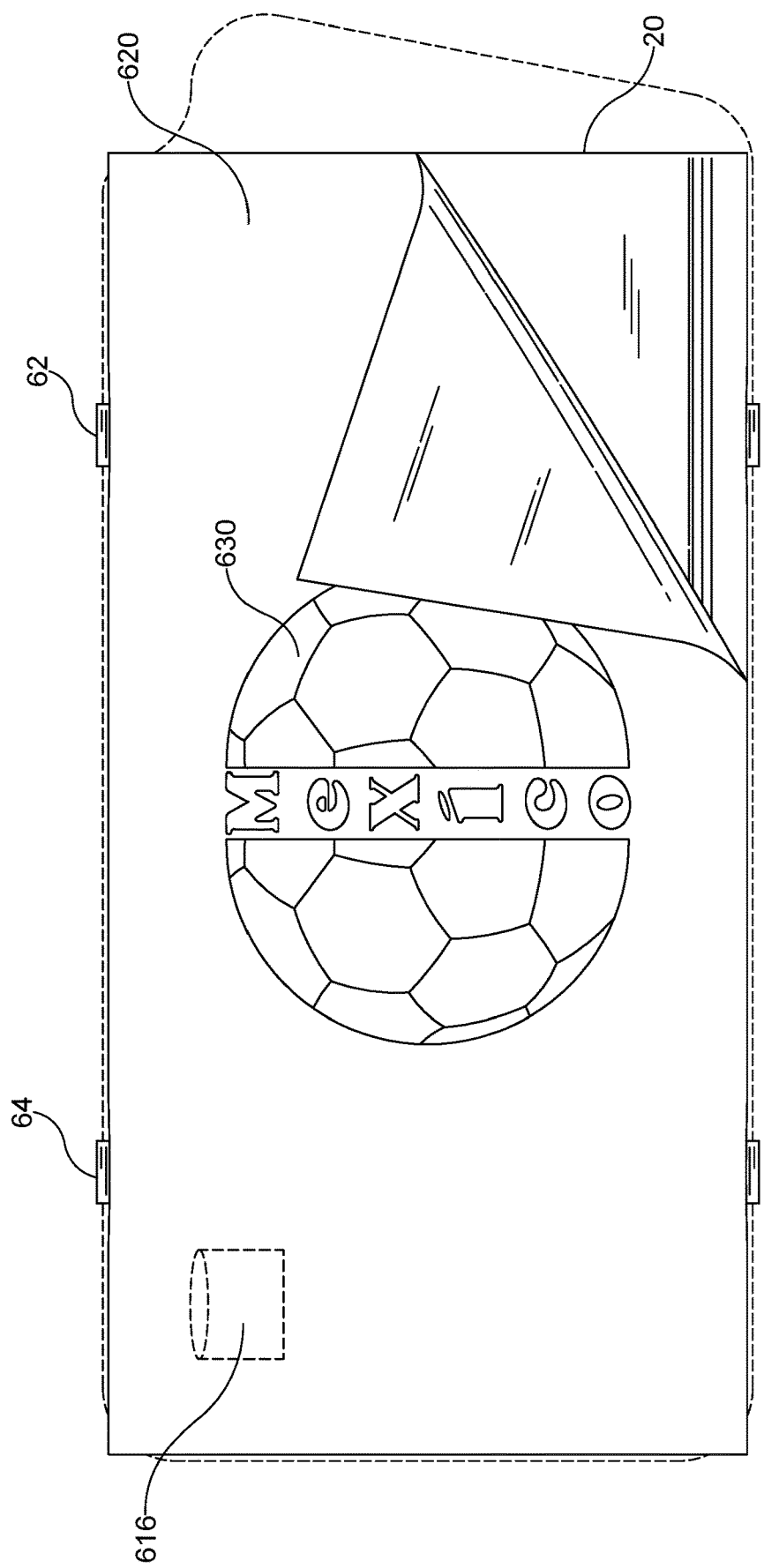
FIG. 5B shows graphics applied to an attachment panel to a cover panel of this disclosure.

As shown in FIG. 5B, the cover of this disclosure may also include an attachment panel 620 attached to the cover. The attachment panel 620 may be attached to the cover by adhesive, Velcro, snap buckle, stitching, and so on. The attachment panel 620 may include graphics 630 so as to provide the cover panel 20 with graphics. In another embodiment, the attachment panel may include one or more pockets 616 for holding an object as shown in FIG. 5B.

In another aspect the attachment panel 620 to cover panel 600 of this disclosure may include one or more pockets 616 for holding an object as shown in FIG. 5B. The object may be selected from the group consisting of a CD or an accessory.

In another embodiment, a pocket is provide along an inside surface of the attachment panel 620 so that the pocket faces the cover when the attachment panel is in place.

In another aspect a pocket may be provided on any side of a cover or attachment panel or both of this disclosure. Where, for example, a cover or attachment panel or both, attached to one side of a visor as herein disclosed, also wraps around at least a part of another side of the visor, a pocket along that another side of the visor may also be provided.

Also, where, for example, a cover or attachment panel or both, attached to one side of a visor as herein disclosed, also wraps around at least a part of another side of the visor, a graphic(s) applied to the cover or attachment panel or both along that another side of the visor may also be provided.

In another aspect, the cover of this disclosure may be adapted to a visor 10 of a vehicle. See FIG. 1. The cover panel 20 may be positioned on a side of the visor that faces away from the vehicle when the visor is in use. The first and second straps may be positioned on a side of the visor that faces a driver when the visor is in use.

The vehicle may be a vehicle selected from the group consisting of motor vehicles, including cars, trucks, buses, motorcycles including mopeds and scooters, railed vehicles, including trains and trams, watercraft including ships and boats, amphibious vehicles including screw-propelled vehicle, hovercraft, aircraft including airplanes and helicopters, spacecraft, and wagons, bicycles, and carts including manual push or pull carts and mobile carts, including animal drawn carts and golf carts.

Figure 6A:
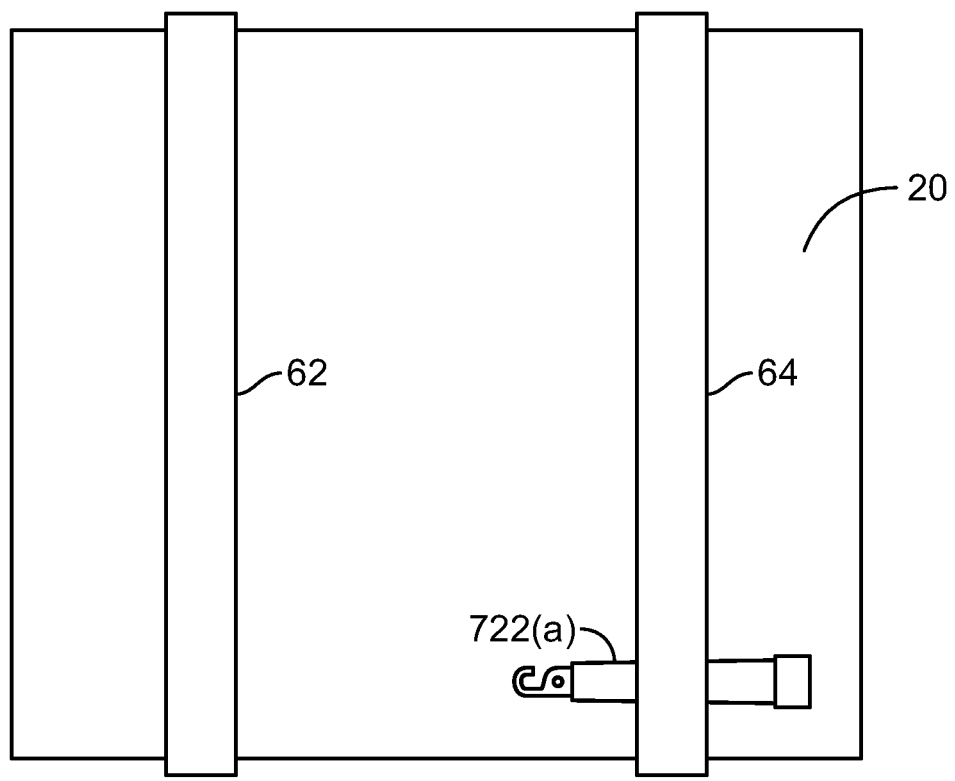
FIG. 6A shows illustrative light unit adapted to the cover panel according to this disclosure.

As shown in FIG. 6, a light unit 722 may be adapted to the cover panel 20. The light unit may be a glow stick, a battery powered light unit, or a light unit powered by a power source in a vehicle. The light unit may be configured to provide lighting to the cover panel 20. For example, 722(*a*) is a glow stick that may be activated by breaking. As shown in FIG. 6A, the activated glow stick may be placed against the back of the cover panel that lies against the visor. Alternatively, the light unit may be configured for attachment to the front side of the cover panel.

In an alternative embodiment where an attachment panel is used, the light unit may be placed between the attachment panel and the cover panel. Alternatively, the light unit may be adapted to the front side of the attachment panel.

Figure 6B:
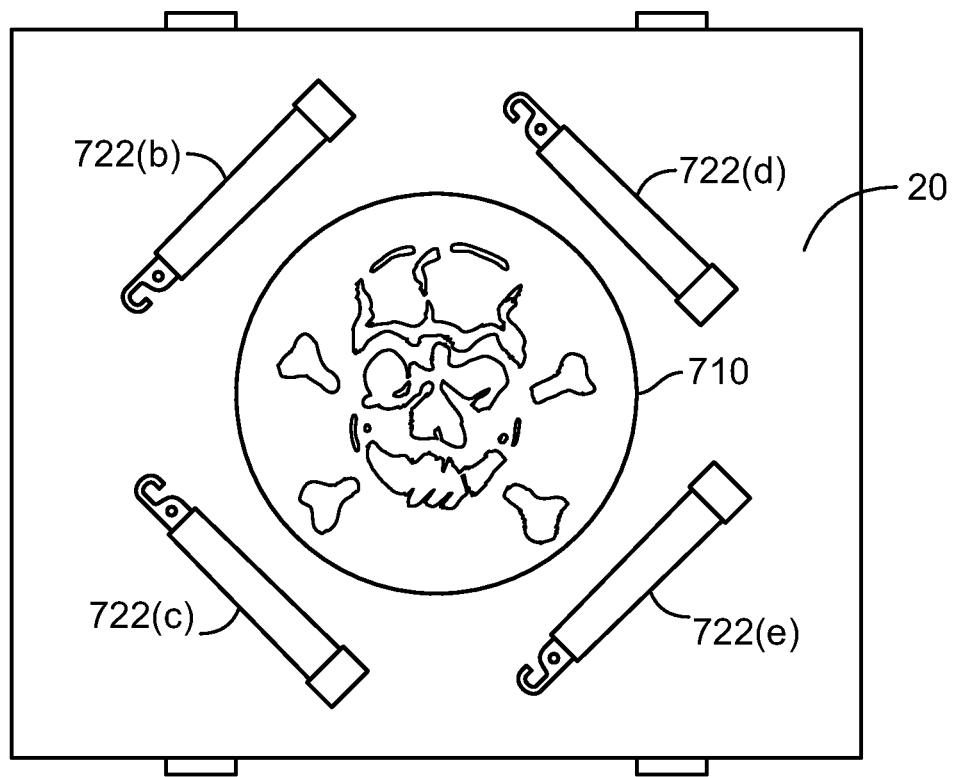
FIG. 6B shows an arrangement of light units adapted to the cover panel according to this disclosure.

FIG. 6B shows a cover panel 20 including four light units 722(*b*), 722(*c*), 722(*d*) and 722(*e*). Any number of light units may be adapted to the cover panel of this disclosure subject only to the surface area of the portions of the cover that may be visible. In one embodiment, a cover panel, or attachment panel, or both, is a material and thickness sufficient for a light unit to provide illumination therethrough. In another embodiment, a cover panel, or attachment panel, or both has a thickness that may provide visible lighting when illuminated. In this example, the sides of the cover panel, the attachment panel, or both may provide visible lighting.

The number of light units that may be adapted to the cover panel of this disclosure is a matter of design choice. For example, light units 722(*b*) and 722(*d*) may be adapted to one cover panel of this disclosure to provide lighting along the upper periphery of the cover panel. In another example, light units may be adapted to the bottom periphery of the cover panel. The light units may be placed alongside of or behind the graphics in any configuration to satisfy the visual imagery desired by a user of this disclosure.

While the previous embodiments employed certain strap connector and strap attachment mechanisms, this disclosure contemplates the use of any number of strap connectors and strap attachment mechanisms.

In illustrative Embodiment A, both straps may be provided with releasable strap connectors for releasable connection through openings 32', 34', 36', and 38', each serving to releasably secure the associated end of the respective strap to the cover panel 20.

Illustrative Embodiment B

In another illustrative embodiment reference is made to FIG. 2 modified as follows. The cover for a vehicle includes the cover panel 20, a first pole (i.e., one of either pole 92 or pole 94), and the first strap 62 and the second strap 64. In this embodiment, a first cover loop is provided along at least part of one of a top periphery or a bottom periphery of the cover panel 20 (i.e., the first cover loop is either the top cover loop 42 or the bottom cover loop 44). The cover loop includes a first cover opening (i.e., the first cover opening is the first cover opening 32' if the loop is the top cover loop and the first cover opening 36' if the loop is the bottom cover loop). The first pole is disposed through the first cover loop. One of the first strap 62 and the second strap 64 is integrally or releasably connected at a first end to one of the top periphery and the bottom periphery of the cover panel 20 and is integrally or releasably connected at a second end to the one of the top periphery and the bottom periphery of the cover panel 20. Another of the a first strap 62 and a second strap 64 is integrally or releasably connected at a first end to one of the top periphery and the bottom periphery of the cover panel 20 and advantageously is releasably connected by a first strap connector at a second end to the one of the top periphery and the bottom periphery of the cover panel 20. The first strap connector engages the first pole through the first cover opening of the first cover loop and the engagement of the first pole by the first strap connector releasably secures the another of the a first strap 62 and a second strap 64 to the cover panel 20.

The first strap connector may be any of the strap connectors disclosed herein such as in FIGS. 3 and 4. The cover panel may be provided with graphics and/or a panel as described in FIG. 5A. The graphics and/or the panel may also be provided to an attachment panel adapted to the cover panel as described in FIG. 5B. The cover panel and/or attachment panel may be provided with light units as described in FIG. 6.

In illustrative Embodiment B, one end of one strap may be provided with a releasable strap connector with the other end of that strap and both ends of the other strap being integrally connected to the cover or also being provided with a releasable strap connector. Where, for example, there is a releasable strap connector on only one end of one strap, the other end of that strap and both ends of the other strap would be integrally secured to the cover such as by stitching. In this example, the releasable strap connector allows its associated strap to be relaxed during assembly to the visor while the other strap with both ends integrally connected to the cover is slipped over the visor. After adjustment of the cover to the desired positioning with respect to the visor, the releasable strap connector may be releasably connected to the pole to releasably secure the associated end of the respective strap to the cover panel 20 and hence hold the cover panel securely to the visor.

As one example, one of top or bottom cover loops may have a first opening. For instance, either of openings 32', 34', 36', or 38' as shown in FIG. 2 may serve as the opening for the relasable connector in this example. In one example, no other openings would be provided and the attachment of the ends of the straps at those locations may be by integral connection such as stitching. In other examples, other openings may be provided to serve releasable connectors should a releasable connector instead of integral connection be used in those examples.

Where more than only one end of one strap is provided with a releasable strap connector, each end with strap connector may be relaxed during assembly and releasably connected to the pole to complete the secure attachment of the cover to the visor.

Illustrative Embodiment C

As another illustrative example, the first cover loop in Illustrative Embodiment B may further include a second cover opening 34. The first integrally or releasably connected end of the one of the a first strap 62 and a second strap 64 in this embodiment is advantageously releasably connected by a second strap connector to the one of the top periphery and the bottom periphery of the cover panel 20. The second strap connector engages the first pole 92 through the second cover opening 34 of the first cover loop. The engagement of the first pole 92 by the second strap connector releasably secures the second strap 64 to the cover panel 20.

Any of the first strap connector, the second strap connector may be any of the strap connectors as disclosed herein such as in FIGS. 3 and 4. The cover panel may be provided with graphics and/or a panel as described in FIG. 5A. The graphics and/or the panel may also be provided to an attachment panel adapted to the cover panel as described in FIG. 5B. The cover panel and/or attachment panel may be provided with light units as described in FIG. 6.

In illustrative Embodiment C, one end of each strap may be provided with a releasable strap connector with the other ends of the straps being integrally connected to the cover or also being provided with a releasable strap connector. Where, for example, there is a releasable strap connector on one end of both straps and the other ends of the straps are integrally secured to the cover, the integral securing may be as disclosed herein, such as by stitching. In this example, the releasable strap connector on one end of both straps may be relaxed during assembly to the visor while the cover is slipped over the visor. After adjustment of the cover to the desired positioning with respect to the visor, the releasable strap connectors of both straps may be releasably connected to the pole to releasably secure both straps to the cover panel 20 and hence hold the cover panel securely to the visor.

In one example, the releasable connectors of both straps may releasably connect to the cover through openings provided on the same cover loop. For example, both openings may be provided in top cover loop such as openings 32', 34' in FIG. 2 in which case both straps may releasable connect to the same cover loop. Alternatively, one opening may be provided on top cover loop and the other opening on bottom cover loop, such as for instance the combination of openings 32', 38' or 34',36'. The pair of openings in this example are not generally aligned; rather spaced apart from each other in order to allow for the two straps to travel independent paths across the span of the cover. In the 32', 38' combination of openings, the releasable connector of one strap would releasable connect to pole 92 through opening 32' and the other strap to pole 94 through opening 38'. In the 34', 36' combination of openings, the releasable connector of one strap would releasable connect to pole 92 through opening 34' and the other strap to pole 94 through opening 36'.

Illustrative Embodiment D

As another illustrative example, the first cover loop in Illustrative Embodiment B may further include a second cover loop along at least part of another of the a top periphery or a bottom periphery of the cover panel 20. The second cover loop includes a first cover opening 36'. The first cover opening of each of the first cover loop and the second cover loop are in general alignment with respect to each other. The cover includes a second pole 94, the second pole 94 being disposed through the second cover loop. The first integrally or releasably connected end of the another of the a first strap 62 and a second strap 64 is releasably connected by a second strap connector to the other one of the top periphery and the bottom periphery of the cover panel 20. The second strap connector engaging the second pole 94 through the first cover opening of the second cover loop. The engagement of the second pole 94 by the second strap connector releasably secures the first strap 62 to the cover panel 20.

Any of the first strap connector, the second strap connector may be any of the strap connectors disclosed herein such as in FIGS. 3 and 4. The cover panel may be provided with graphics and/or a panel as described in FIG. 5A. The graphics and/or the panel may also be provided to an attachment panel adapted to the cover panel as described in FIG. 5B. The cover panel and/or attachment panel may be provided with light units as described in FIG. 6.

In illustrative Embodiment D, both ends of one strap may be provided with a releasable strap connector with the ends of the other strap being integrally connected to the cover or also being provided with a releasable strap connector. Where, for example, there is a releasable strap connector on both ends of one strap, the both ends of the other strap may be integrally secured to the cover such as by stitching. In this example, the strap that is integrally connected to the cover may be slipped over the visor. After adjustment of the cover to the desired positioning with respect to the visor, the releasable strap connectors of the other strap may be releasably connected to the pole to releasably secure the associated end of the respective strap to the cover panel 20 and hence hold the cover panel securely to the visor.

In one example, openings 32', 36' in FIG. 2 may be used to releasable secure the strap with releasable strap connectors to the opposing poles to secure the covers. In this case, the top and bottom cover loops may not have openings 34', 38' and the ends of the other strap may be integrally secured along those portions such as such as by stitching. In another example, openings 34', 38' may be used for the connection by the releasable strap connectors and there may be no openings 32', 36' and the ends of the other strap may be integrally secured along those portions such as by stitching.

Illustrative Embodiment E

As another illustrative example, the first cover loop in Illustrative Embodiment B may further include a second cover opening 34. The first integrally or releasably connected end of the one of the a first strap 62 and a second strap 64 is releasably connected by a second strap connector to the one of the top periphery and the bottom periphery of the cover panel 20. The second strap connector engages the first pole 92 through the second cover opening 34 of the first cover loop. The engagement of the first pole 92 by the second strap connector releasably secures the second strap 64 to the cover panel 20.

In addition to the first cover loop, a second cover loop may be provided along at least part of another of the a top periphery or a bottom periphery of the cover panel 20. The second cover loop includes a first cover opening 36'. The first cover opening of each of the first cover loop and the second cover loop are in general alignment with respect to each other. The cover includes a second pole 94, the second pole 94 being disposed through the second cover loop. The first integrally or releasably connected end of the another of the a first strap 62 and a second strap 64 is releasably connected by a third strap connector to the other one of the top periphery and the bottom periphery of the cover panel 20. The third strap connector engaging the second pole 94 through the first cover opening of the second cover loop. The engagement of the second pole 94 by the third strap connector releasably secures the first strap 62 to the cover panel 20.

Any of the first strap connector, the second strap connector, and the third strap connector may be any of the strap connectors disclosed herein such as in FIGS. 3 and 4. The cover panel may be provided with graphics and/or a panel as described in FIG. 5A. The graphics and/or the panel may also be provided to an attachment panel adapted to the cover panel as described in FIG. 5B. The cover panel and/or attachment panel may be provided with light units as described in FIG. 6.

In illustrative Embodiment E, both ends of one strap and one end of an other strap may be provided with a releasable strap connector with the other end of the other strap being integrally connected to the cover or also being provided with a releasable strap connector. Where, for example, there is a releasable strap connector on both ends of one strap and the one end of an other strap, the other end of the other strap may be integrally secured to the cover such as by stitching. In this example, after adjustment of the cover to the desired positioning with respect to the visor, the releasable strap connectors of straps may be releasably connected to the pole to releasably secure the associated end of the respective strap to the cover panel 20 and hence hold the cover panel securely to the visor.

Figure 7A:
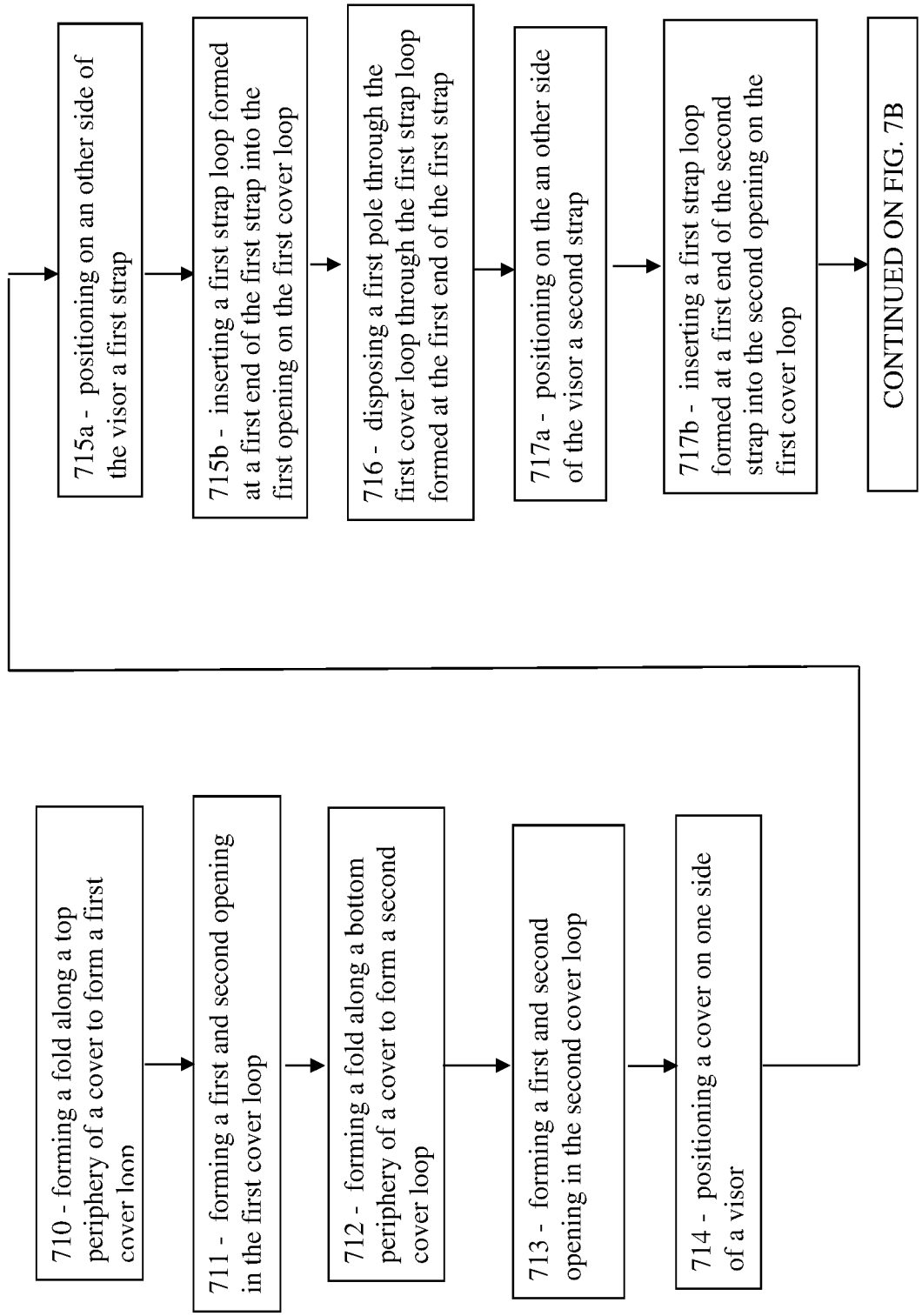
FIGS. 7A and 7B depict a method for assembly of the cover of this disclosure.
Figure 7B:
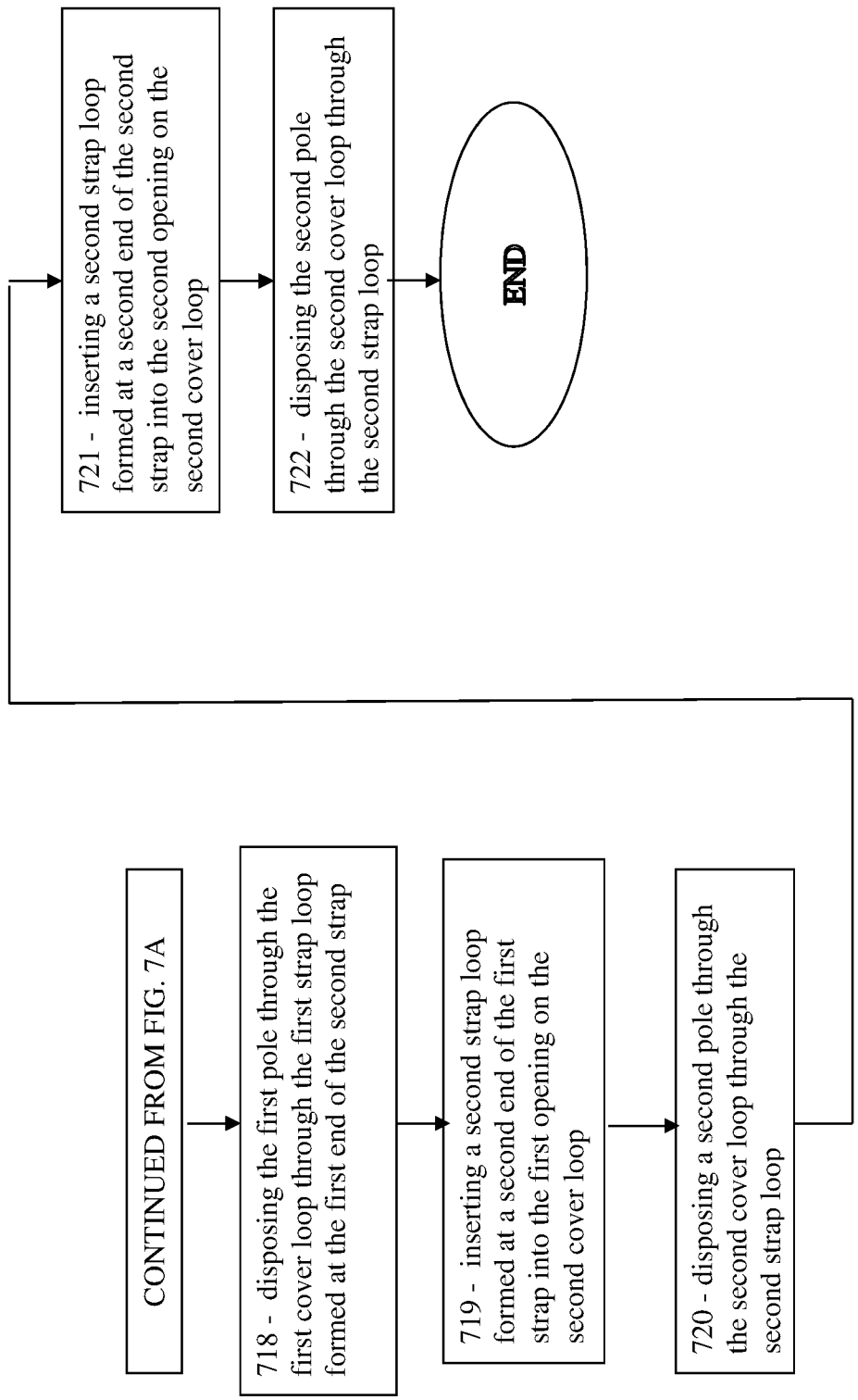

The steps of making the cover of this disclosure, as shown in FIGS. 7A-7B, include: 710 forming a fold along a top periphery of a cover panel to form a first cover loop; 711 forming a first and second opening in the first cover loop; 712 forming a fold along a bottom periphery of the cover panel to form a second cover loop; 713 forming a first and second opening in the second cover loop; 714 positioning a cover panel on one side of a visor; 715a positioning on an other side of the visor a first strap; 715b inserting a first strap loop formed at a first end of the first strap into the first opening on the first cover loop; 716 disposing a first pole through the first cover loop through the first strap loop formed at the first end of the first strap; 717*a* positioning on the an other side of the visor a second strap; 717*b* inserting a first strap loop formed at a first end of the second strap into the second opening on the first cover loop; 718 disposing the first pole through the first cover loop through the first strap loop formed at the first end of the second strap; 719 inserting a second strap loop formed at a second end of the first strap into the first opening on the second cover loop; 720 disposing a second pole through the second cover loop through the second strap loop; 721 inserting a second strap loop formed at a second end of the second strap into the second opening on the second cover loop; and 722 disposing the second pole through the second cover loop through the second strap loop.

There is thus disclosed a cover for a vehicle including two straps with at least one strap forming a first connector at one end; a cover panel with at least one of top and bottom loops along top and bottom peripheries of the cover panel and at least one of a first and second opening along at least one of the one of top and bottom loops configured to receive the first connector on the end of the at least one strap; and at least one of a first and a second pole disposed through the loop of the cover panel and engaging the first connector on the end of the at least one strap, the first connector configured to hold the strap to the cover panel for releasable securing the strap to the cover panel. The cover panel may be placed against one side of a visor with the straps against the other side of the visor to form a system.

In another aspect, both straps may be provided with releasable strap connectors at both ends for releasable connection through openings, each serving to releasably secure the associated end of the respective strap to the cover panel 20.

In another aspect, one end of one strap may be provided with a releasable strap connector with the other end of that strap and both ends of the other strap being integrally connected to the cover or also being provided with a releasable strap connector.

In another aspect, one end of each strap may be provided with a releasable strap connector with the other ends of the straps being integrally connected to the cover or also being provided with a releasable strap connector.

In another aspect, both ends of one strap may be provided with a releasable strap connector with the ends of the other strap being integrally connected to the cover or also being provided with a releasable strap connector.

In another aspect, both ends of one strap and one end of an other strap may be provided with a releasable strap connector with the other end of the other strap being integrally connected to the cover or also being provided with a releasable strap connector.

While the embodiments illustrate solutions involving two straps, it will be appreciated that any number of straps may be used with the teachings of this disclosure. The number of straps may depend on the size of the visor and may be a matter of design choice.

In another aspect, the strap for use with this disclosure may be adjustable. The adjustability may come from the strap being made from a flexible, stretch material like plastic, rubber. The strap may be made from rubber, elastic banding, SPANDEX, elastomers and/or a combination thereof. Alternatively, the strap may be made from a material that is bendable such as leather with adjustability provided by the releasable attachment mechanism. Alternatively, the strap may be made from other materials with the adjustability provided by the use of flexible strap connectors and/or flexible releasable attachment mechanisms.

In some aspects, a first cover opening and a second cover opening of each of the top cover loop and the bottom cover loop may have the same or substantially the same opening dimensions, or have openings of different dimensions or have one or more openings of the same dimension and the remaining openings of different dimension. Illustratively, the dimensions of any cover opening should be sufficiently long enough to accommodate the width of the strap and sufficiently wide enough to accommodate the strap connector. In another aspect, the length of the opening may be greater than the width of the strap so as to allow the strap connector to be positionable along the portion of the pole accessible by the strap through the opening. This may allow the strap to be laterally moved inwardly or outwardly so as to better position the portion of the strap that lies between the strap connectors and that spans the visor better with respect to the visor. For instance, where a visor is configured with a vanity mirror, the use of cover openings having a width greater than the width of the strap allows the strap to be positionable along the cover so that the strap coacts with the vanity mirror in a better fashion. For instance, by movement of the strap connectors along the pole that is accessible through the cover opening inward or outward, the portion of the strap that extends between the connectors may be configured to extend inward or outward from the vanity mirror so as not to interfere with the operation of the vanity mirror.

In another aspect, the dimensions of the cover opening may be dictated by the length of the opening along a cover loop required to accommodate the strap connector and any moveability that may be required of the strap connector along the pole to allow for the strap to better coact with the visor. In another aspect, the length of the cover opening for allowing for adjustability of a strap connector along a portion of a pole may be dictated by the remainder of the cover loop without opening which should be structurally sufficient to accommodate the holding force of the pole to the cover loop under the influence of the force of the strap when the strap is connected to the pole by the strap connector.

In other aspects, the length and width of the dimension of an opening is a matter of design choice.

The strap may be manufactured from materials resistant to deterioration from sunlight. The adjustable feature of the strap, strap connector, and/or releasable attachment mechanism allows the cover of this disclosure to fit visors of many sizes. The cover of this disclosure may be configured to fit an illustrative visor size of 5 inch tall by 12 inch wide by $\frac{3}{8}^{th}$ inch deep. In another example, the cover of this disclosure may be configured to fit an illustrative visor size of 6 inch tall by 12 inch wide. In another example, the cover of this disclosure may be configured to fit an illustrative visor size of bigger or smaller sizes. The size of a visor may depend on the make and model and size. For instance, a smaller vehicle may be provided with smaller visors whereas vehicles of larger size, such as a larger car or a truck may have a visor of larger dimensions.

In one aspect, the cover panel may be configured to cover all or substantially all of the area of the visor (e.g., all or substantially all of a 5 by 12 inch visor) with the strap lengths configured to have a length such that after adjustment tightly extends the length (e.g., the 5 inch length) plus the depth along the top side of the visor (e.g., $\frac{3}{8}^{th}$ inch depth along the top side of the visor) plus the depth along the bottom side of the visor (e.g., $\frac{3}{8}^{th}$ inch along the bottom side of the visor) to hold the cover firmly to the visor. Alternatively, the cover panel may be any size to cover part, substantially, or all of the area of the visor. In some embodiments, the cover may fold along the top, bottom, both top and bottom sides, and/or along a portion of the top or bottom or other peripheries of the back side of the visor.

th In some examples, the pole of this disclosure may be a ¼ inch diameter piece of wood. Alternatively, the pole may be made from any material of sufficient strength to hold the forces of the strap connector and/or strap. Diameters larger and smaller may be used with the specific diameter a matter of design requirements and preference. The pole may have a length that spans the entire length of or the top cover loop and/or the bottom cover loop. Alternatively, the pole may have a shorter length that provides the strength sufficient to hold the forces of the strap connector and/or strap. In one embodiment, wire having the diameter of a clothes hanger wire was used as a pole in this disclosure. The dimensions of the pole, cover including openings and top and bottom loops, and strap including the configuration of the loops at ends is a matter of design choice.

The cover openings of this disclosure are illustratively the width of the strap connector. Alternatively, the dimensions of the cover openings are a matter of design choice.

While the disclosure has been described in conjunction with specific embodiments, it is evident that numerous alternatives, modifications, and variations will be apparent to those skilled in the art within the spirit and scope of the disclosure described above.

I Claim:

1. A cover for a vehicle comprising:
    a cover panel, the cover panel including a cover loop along a top periphery forming a top cover loop and a cover loop along a bottom periphery of the cover panel forming a bottom cover loop, the top cover loop and the bottom cover loop each including a first cover opening and a second cover opening, the first cover opening and the second cover opening of each of the top cover loop and the bottom cover loop being spaced apart from each other and with the first cover opening of each of the top cover loop and the bottom cover loop and the second cover opening of each of the top cover loop and the bottom cover loop being in general alignment with respect to each other;
    wherein each of the top cover loop and the bottom cover loop is formed by a respective end portion of the cover panel being folded back onto and being integrally connected to a portion of the panel adjoining the respective end portions by stitching, adhesive, or ultrasonic bonding;
    a first pole and a second pole, the first pole being insertable into and removable from and supported by the top cover loop and the second pole being insertable into and removable from the bottom cover loop;
    a first strap including a first loop on a first end of the first strap, the first loop of the first strap being formed by an end portion of the first strap being folded back onto and being integrally connected to a portion of the first strap adjoining the end portion by stitching, adhesive, or ultrasonic bonding to create a permanent loop on the end of the first strap;
    wherein the first pole being slideable into and out of the first loop of the first strap, the first pole extending through the first loop of the first strap across the first cover opening of the top cover loop;
    wherein with the first pole inserted into the first loop of the first strap, the integral connection of the end portion of the first strap folded back onto and connected to the portion of the first strap adjoining the end portion is near the first pole; and
    wherein the engagement of the first pole by the first loop of the first strap through the first cover opening of the top cover loop releasably secures the first loop of the first strap to the cover panel.

2. The cover according to claim 1 wherein the cover panel is provided with graphics.

3. The cover of claim 2 wherein the graphics on the cover panel are selected from the group consisting of silk screened graphics, thermal printed graphics, and embroider graphics.

4. The cover according to claim 3 further comprising an attachment panel attached to the cover panel, wherein the graphics on the cover panel are applied to the attachment panel.

5. The cover according to claim 2 wherein a light unit is adapted to the cover panel, the light unit configured to provide lighting to the cover panel.

6. The cover according to claim 1 further comprising pockets for holding an object.

7. The cover according to claim 1 wherein the cover further comprising:
    a second strap including a first loop on a first end of the second strap, the first loop of the second strap engaging the first pole through the second cover opening of the top cover loop;
    wherein the engagement of the first pole by the second loop of the second strap through the second cover opening releasably secures the first loop of the second strap to the cover panel.

8. The cover according to claim 7:
    wherein the cover is attached to a visor of a vehicle:
    wherein the cover being positioned on a side of the visor that faces away from the vehicle when the visor is in use; and
    wherein the first and second straps being positioned on a side of the visor that faces a driver when the visor is in use.

9. The cover according to claim 8:
    wherein the vehicle is a vehicle selected from the group consisting of motor vehicles, including cars, trucks, buses, motorcycles including mopeds and scooters, railed vehicles, including trains and trams, watercraft including ships and boats, amphibious vehicles including screw-propelled vehicle, hovercraft, aircraft including airplanes and helicopters, spacecraft, and wagons, bicycles, and carts including manual push or pull carts and mobile carts, including animal drawn carts and golf carts.

10. The cover according to claim 1 wherein the first strap including a second loop on a second end of the first strap, the second loop of the first strap engaging the second pole through the first cover opening of the bottom cover loop;
    wherein the engagement of the second pole by the second loop of the first strap through the first cover opening of the bottom cover loop releasably secures the second loop of the first strap to the cover panel.

11. The cover according to claim 9 wherein the second strap including a second loop on a second end of the second strap, the second loop of the second strap engaging the second pole through the second cover opening of the bottom cover loop;
    wherein the engagement of the second pole by the second loop of the second strap through the second cover opening of the bottom cover loop releasably secures the second loop of the second strap to the cover panel.

12. The cover according to claim 1 wherein the first strap including a VELCRO® hook on one portion and a VELCRO® fastener on another portion of a second end of the first strap, the first strap looping the second pole through the first cover opening of the bottom cover loop;
  wherein the engagement of the hook and loop fastener VELCRO® following looping of the first strap through the second pole through the first cover opening of the bottom cover loop releasably secures the first strap to the cover panel.

13. The cover according to claim 9 wherein the second strap including a VELCRO® hook on one portion and a VELCRO® fastener on another portion of a second end of the second strap, the second strap looping the second pole through the second cover opening of the bottom cover loop;
  wherein the engagement of the hook and loop fastener VELCRO® following looping of the second strap through the second pole through the second cover opening of the bottom cover loop releasably secures the second strap to the cover panel.

14. The cover according to claim 1 wherein the first strap including a buckle on a second end of the first strap, the first strap looping the second pole through the first cover opening of the bottom cover loop;
  wherein the engagement of the buckle following looping of the first strap through the second pole through the first cover opening of the bottom cover loop releasably secures the first strap to the cover panel.

15. The cover according to claim 9 wherein the second strap including a buckle on a second end of the second strap, the second strap looping the second pole through the second cover opening of the bottom cover loop;
  wherein the engagement of the buckle following looping of the second strap through the second pole through the second cover opening of the bottom cover loop releasably secures the second strap to the cover panel.

16. The cover according to claim 1 wherein the cover is a stitchable material.

17. The cover according to claim 1 wherein the cover panel is provided with embroider graphics.

18. The cover according to claim 16 wherein the stichable material is provided with embroider graphics.

19. The cover according to claim 11 wherein the cover panel is provided with graphics.

20. The cover according to claim 15 wherein the cover panel is provided with graphics.

* * * * *